United States Patent
Tiemann et al.

(10) Patent No.: US 8,278,911 B2
(45) Date of Patent: Oct. 2, 2012

(54) INDUCTIVE ANGLE-OF-ROTATION SENSOR AND METHOD FOR OPERATING AN INDUCTIVE ANGLE-OF-ROTATION SENSOR

(75) Inventors: Marc Oliver Tiemann, Salzburg (AT); Eva Silmbroth, Raubling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 266 days.

(21) Appl. No.: 12/935,218

(22) PCT Filed: Mar. 24, 2009

(86) PCT No.: PCT/EP2009/053427
§ 371 (c)(1),
(2), (4) Date: Sep. 28, 2010

(87) PCT Pub. No.: WO2009/124836
PCT Pub. Date: Oct. 15, 2009

(65) Prior Publication Data
US 2011/0068777 A1    Mar. 24, 2011

(30) Foreign Application Priority Data
Apr. 9, 2008    (DE) .......................... 10 2008 017 857

(51) Int. Cl.
*G01B 7/14*    (2006.01)
*G01B 7/30*    (2006.01)
(52) U.S. Cl. ............................... 324/207.15; 324/207.25
(58) Field of Classification Search ............. 324/207.15, 324/207.25
See application file for complete search history.

(56) References Cited

U.S. PATENT DOCUMENTS

| 6,111,402 A | 8/2000 | Fischer |
|---|---|---|
| 7,719,264 B2 | 5/2010 | Tiemann |

FOREIGN PATENT DOCUMENTS

| DE | 197 51 853 | 6/1998 |
|---|---|---|
| EP | 0 845 659 | 6/1998 |
| EP | 1 906 153 | 4/2008 |

OTHER PUBLICATIONS

International Search Report, PCT International Application No. PCT/EP2009/053427, dated Jun. 25, 2009.

*Primary Examiner* — Bot Ledynh
(74) *Attorney, Agent, or Firm* — Kenyon & Kenyon LLP

(57) ABSTRACT

An inductive angle-of-rotation sensor includes a printed circuit board, on which one excitation conductor path, and a first, second as well as third receiving conductor path are applied. The angle-of-rotation sensor further includes a graduation element having a first and second graduation track. The first and second graduation tracks, and the first and second receiving conductor paths are arranged such that signals having a first period number are able to be generated by the first receiving conductor path, and signals having a second period number are able to be generated by the second receiving conductor path. The graduation element further has a third graduation track, so that signals having the first period number are able to be generated by the third receiving conductor path. In addition, a method is provided for operating an angle-of-rotation sensor.

15 Claims, 7 Drawing Sheets

INDUCTIVE ANGLE-OF-ROTATION SENSOR AND METHOD FOR OPERATING AN INDUCTIVE ANGLE-OF-ROTATION SENSOR

FIELD OF THE INVENTION

The present invention relates to an inductive angle-of-rotation sensor for determining relative angular positions and to a method for operating an inductive angle-of-rotation sensor.

BACKGROUND INFORMATION

Inductive angle-of-rotation sensors are used, for example, in rotary encoders to determine the angular position of two machine parts rotatable relative to each other. In inductive angle-of-rotation sensors, excitation coils and receiving coils, for instance, in the form of conductor paths, are applied to a shared printed circuit board that is fixedly joined to a stator of a rotary encoder, for example. Disposed oppositely to this printed circuit board is a further board often in the form of a graduated disk, on which electrically conductive and non-conductive surfaces are applied so as to alternate at periodic intervals as graduation region or graduation structure, and which is joined in torsionally fixed fashion to the rotor of the rotary encoder. When an electrical excitation field alternating over time is applied to the excitation coils, signals are generated in the receiving coils as a function of the relative angular position between rotor and stator.

Rotary encoders having inductive angle-of-rotation sensors are often used as measuring devices for electrical drives, to determine the absolute angular position of corresponding drive shafts.

German Published Patent Application No. 197 51 853 describes an arrangement for an inductive angle-of-rotation sensor in which two graduation tracks of a graduated disk, that is, of a graduation element are scanned by receiving coils on a printed circuit board. To prevent faulty signals from being generated, such angle-of-rotation sensors must be prepared with comparatively small manufacturing tolerances, especially if the receiving coils have a comparatively large outside diameter.

To be understood by manufacturing tolerances hereinafter are, in particular, fitting tolerances as well, which come about when mounting the angle-of-rotation sensor on a shaft to be measured. For example, such fitting tolerances or fitting inaccuracies may cause wobble motions of the rotor or inclined positions of the rotor and/or of the stator.

SUMMARY

Example embodiments of the present invention provide a cost-effective inductive angle-of-rotation sensor and a method for operating such an angle-of-rotation sensor, by which high signal quality and exceedingly accurate measuring results are attainable.

According to example embodiments of the present invention, the inductive angle-of-rotation sensor includes a printed circuit board on which one excitation conductor path, and a first, second as well as a third receiving conductor path are applied. The angle-of-rotation sensor further includes a graduation element which is rotatable relative to the printed circuit board, and includes a first as well as a second graduation track, each made up in particular of alternately arranged, electrically conductive and non-conductive graduation regions. The first and second graduation tracks and the first and second receiving conductor paths are arranged such that within one rotation of the graduation element relative to the printed circuit board, signals having a first period number are able to be generated by the first receiving conductor path, and signals having a second period number are able to be generated by the second receiving conductor path. At the same time, the graduation element has a third graduation track which likewise may be made up of alternately arranged, electrically conductive and non-conductive graduation regions, the third graduation track and the third receiving conductor path being arranged such that within one rotation of the graduation element relative to the printed circuit board, signals having the first period number are able to be generated by the third receiving conductor path. Such an arrangement of an angle-of-rotation sensor is particularly suitable for reducing measuring errors caused by wobble motions or inclined position of the graduation element relative to the printed circuit board. The influence of an inclined position of the stator may be reduced, as well.

The distance of the first graduation track to the axis of rotation differs from the distance of the third graduation track to the axis of rotation. In particular, the first graduation track has a radius of curvature which differs from the radius of curvature of the third graduation track.

The innermost graduation track is applied in an area which is bounded by a smaller radius r toward the axis of rotation. On the other hand, the outermost graduation track lies within a larger radius R, both radii r, R having their origin in the axis of rotation. Example embodiments of the present invention may be used in conjunction with annular graduated disks that have a comparatively large inner bore hole. Given this specification, the smaller radius r is often comparatively large. Therefore, example embodiments of the present invention may be used especially when the ratio of the larger radius R to the smaller radius r is less than 3/2 ($R/r<3/2$). For example, $R/r<4/3$, especially $R/r<5/4$, is possible. Namely, in the case of these arrangements with relatively large smaller radius r, wobble motions or inclined positions between the graduated disk and the printed circuit board, which are unavoidable due to manufacturing or fitting tolerances, take effect particularly unfavorably with regard to the quality of the measuring result. These losses in quality of the measuring result are reduced significantly by example embodiments of the present invention.

The angle-of-rotation sensor, especially the printed circuit board, advantageously includes a device by which the signals of the third receiving conductor path are able to be combined with the signals of the first receiving conductor path to form one total signal, a relative angular position between the printed circuit board and the graduation element that is reduced in errors in terms of manufacturing and fitting tolerances being determinable from the total signal. For example, the device may take the form of an electronic circuit, and in particular, may be implemented as an analog electronic circuit. The device may include an addition or subtraction device, i.e., an addition or subtraction circuit. In the simplest form, the circuit may denote merely a serial or a parallel interconnection of the first with the third receiving conductor path.

Hereinafter, the term period number is to be understood as the number of signal periods which are generated by a receiving conductor path within one rotation of the graduation element or graduated disk relative to the printed circuit board.

The first period number may be smaller than the second period number, in particular, the first period number may take the value one.

The first period number may be odd, and the second period number may be even.

The signals which are able to be generated by the first receiving conductor path may have a phase shift of 360°/(2·n1) compared to the signals able to be generated by the third receiving conductor path, n1 representing the value of the first period number of the signals of the first and third receiving conductor paths.

The printed circuit board may have a first receiving track and a third receiving track, the first receiving track including two first receiving conductor paths, and the third receiving track including two third receiving conductor paths.

Furthermore, example embodiments of the present invention provide a method for operating an angle-of-rotation sensor, the angle-of-rotation sensor having a printed circuit board on which one excitation conductor path, and a first, second as well as third receiving conductor path are applied. The angle-of-rotation sensor additionally has a graduation element which is rotated relative to the printed circuit board during operation, and includes a first, second, and a third graduation track, the graduation tracks in particular each being made up of alternately arranged, electrically conductive and non-conductive graduation regions. The first, second and third graduation tracks and the first, second and third receiving conductor paths are arranged such that within one rotation of the graduation element relative to the printed circuit board, signals having a first period number are generated by the first and third receiving conductor paths, and signals having a second period number are generated by the second receiving conductor path. The signals having the first period number are combined to form one total signal, and the relative angular position between the printed circuit board and the graduation element is determined, that is, information about the relative angular position is produced from the total signal.

The signals having the first period number may be combined to form one total signal, using an addition or subtraction operation.

The printed circuit board may have a first receiving track and a third receiving track, the first receiving track including two first receiving conductor paths, and the third receiving track including two third receiving conductor paths, so that two total signals are able to be generated. The two total signals may have a phase shift of 90°. Alternatively, the angle-of-rotation sensor may also be arranged such that more than two total signals are able to be generated, for example, three, which then in each case have a phase shift of 120° or 60° relative to each other.

According to an example embodiment of the present invention, an inductive angle-of-rotation sensor includes: a printed circuit board; an excitation conductor path applied on the printed circuit board; a first receiving conductor path applied on the printed circuit board; a second receiving conductor path applied on the printed circuit board; a third receiving conductor path applied on the printed circuit board; and a graduation element rotatable relative to the printed circuit board, the graduation element including a first graduation track, a second graduation track, and a third graduation track. The first and second graduation tracks and the first and second receiving conductor paths are arranged such that within one rotation of the graduation element relative to the printed circuit board, signals having a first period number are generatable by the first receiving conductor path, and signals having a second period number are generatable by the second receiving conductor path. The third graduation track and the third receiving conductor path are arranged such that within one rotation of the graduation element relative to the printed circuit board, signals having the first period number are generatable by the third receiving conductor path.

According to an example embodiment of the present invention, a method for operating an angle-of-rotation sensor including: a printed circuit board, on which an excitation conductor path, a first receiving conductor path, a second receiving conductor path, and a third receiving conductor path are applied; and a graduation element rotatable relative to the printed circuit board and including a first graduation track, a second graduation track, and a third graduation track, includes: within one rotation of the graduation element relative to the printed circuit board, generating signals having a first period number by the first and third receiving conductor paths and generating signals having a second period number by the second receiving conductor path; combining the signals having the first period number to form a total signal; and determining a relative angular position between the printed circuit board and the graduation element from the total signal.

Further details and aspects of the inductive angle-of-rotation sensor according to example embodiments of the present invention, as well as of the method for operating such an angle-of-rotation sensor are described in more detail below with reference to the accompanying figures.

DETAILED DESCRIPTION

FIGS. 1 to 6 show angle-of-rotation sensors according to example embodiments of the present invention.

Figure 1:
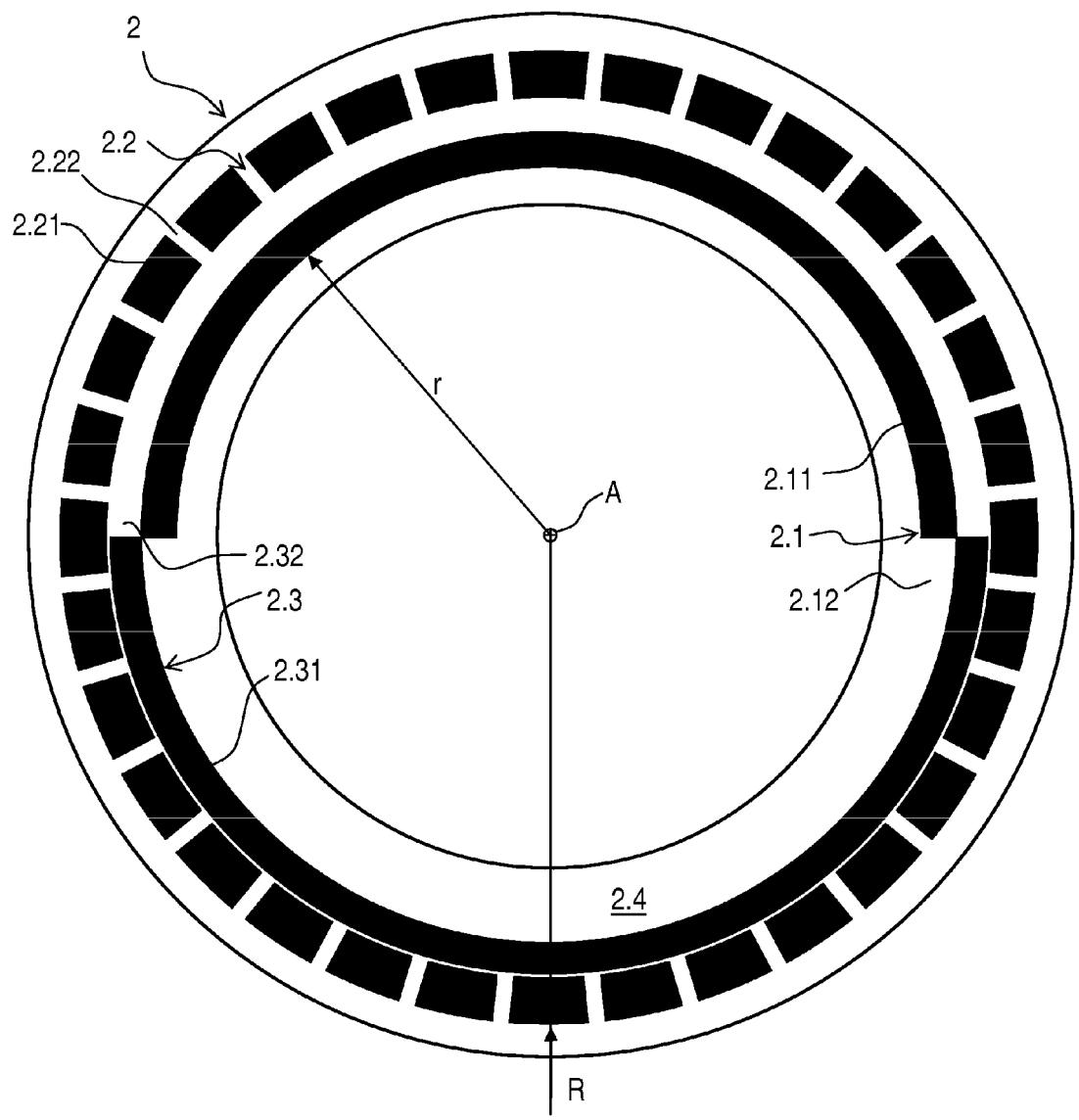
FIG. 1 is a top view of a graduated disk according to an exemplary embodiment of the present invention.

FIG. 1 shows a graduation element in the form of an annular graduated disk 2 according to a first exemplary embodiment. Graduated disk 2 is made up of a substrate 2.4 which is produced from epoxy resin in the exemplary embodiments, and on which three graduation tracks 2.1, 2.2, 2.3 are disposed.

Graduation tracks 2.1, 2.2, 2.3 are circular, and are concentrically disposed with respect to an axis of rotation A, with different diameters, i.e., radially displaced relative to each other, on substrate 2.4. Graduation tracks 2.1, 2.2, 2.3 are each made up of a periodic sequence of alternately arranged, electrically conductive graduation regions 2.11, 2.21, 2.31 and non-conductive graduation regions 2.12, 2.22, 2.32. As material for electrically conductive graduation regions 2.11, 2.21, 2.31, copper is applied on substrate 2.4 in all the examples shown. On the other hand, substrate 2.4 is not coated in non-conductive graduation regions 2.12, 2.22, 2.32.

According to the first exemplary embodiment (FIG. 1), the two inner graduation tracks 2.1 and 2.3, that is, first and third graduation tracks 2.1 and 2.3 in the example embodiment shown, are each made up of a first semicircular graduation region 2.11, 2.31 having electrically conductive material, here copper, as well as of a second semicircular graduation region 2.12, 2.32 in which there is no conductive material. Innermost graduation track 2.1 is applied in an area which is bounded by radius r toward axis of rotation A.

Adjacent radially to the outside with respect to third graduation track 2.3 on substrate 2.4 is second graduation track 2.2, second graduation track 2.2 also being made up of a plurality of electrically conductive graduation regions 2.21, as well as non-conductive graduation regions 2.22 disposed in between. In terms of material, the different graduation regions 2.21, 2.22 are formed in the same manner as graduation regions 2.11, 2.12 of first and third graduation tracks 2.1, 2.3. In the exemplary embodiments shown, second graduation track 2.2 includes altogether thirty-two periodically disposed, electrically conductive graduation regions 2.21, and correspondingly, thirty-two non-conductive graduation regions 2.22 situated in between. Geometrically, second graduation track 2.2 lies within radius R, radius R having its origin in axis of rotation A.

Figure 8:
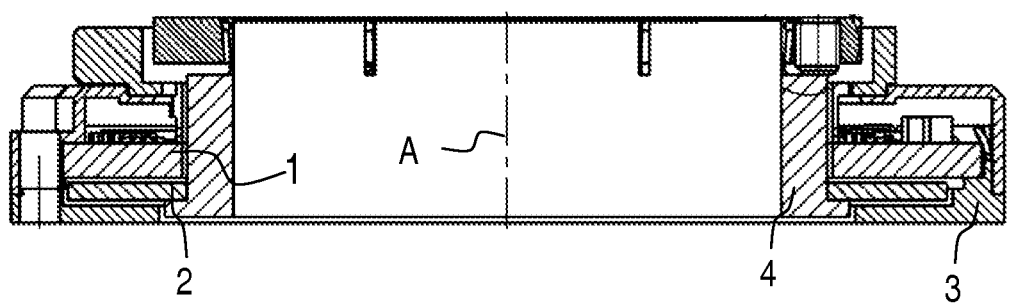
FIG. 8 is a cross-sectional view of a rotary encoder.

Annular graduated disk 2, i.e., substrate 2.4, has a comparatively large inner bore hole for accommodating a shaft 4 to be measured (FIG. 8). Accordingly, the ratio R/r is relatively small, and amounts here to approximately 1.34.

Figure 2:
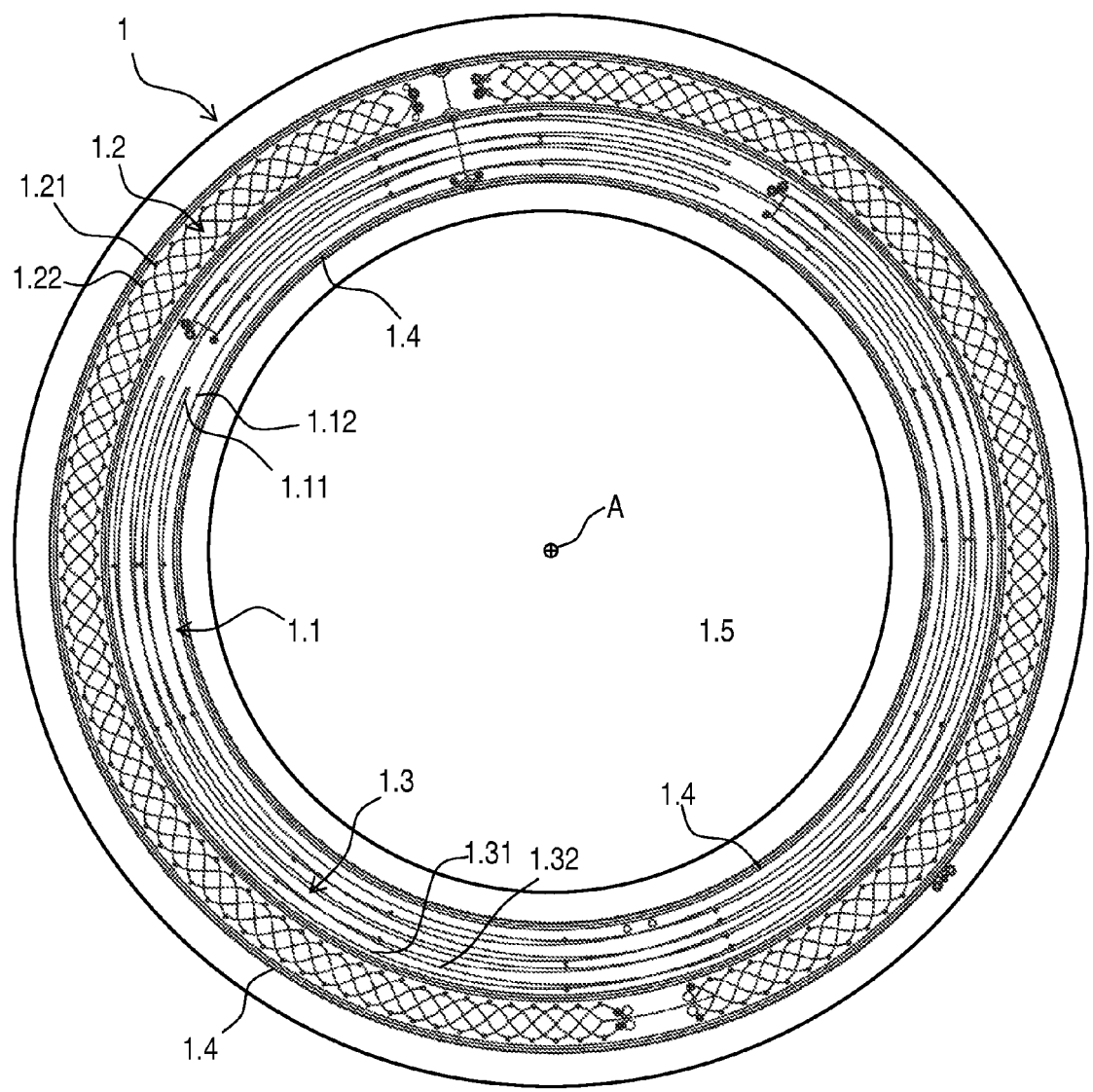
FIG. 2 is a top view of a printed circuit board according to the exemplary embodiment shown in FIG. 1.

Printed circuit board 1, shown in FIG. 2 and provided for scanning graduated disk 2 according to FIG. 1, includes two receiving conductor paths 1.11, 1.12 as receiving coils in an innermost receiving track 1.1, a further two receiving conductor paths 1.31, 1.32 in a middle receiving track 1.3, and an additional pair of receiving conductor paths 1.21, 1.22 in outermost receiving track 1.2. The matching pairs of receiving conductor paths 1.11, 1.12; 1.21, 1.22; 1.31, 1.32 of a particular receiving track 1.1, 1.2, 1.3 are displaced relative to each other.

Moreover, provided as excitation coils on printed circuit board 1 are excitation conductor paths 1.4, which are applied on an inner, a middle and an outer excitation track. Printed circuit board 1 itself has a center bore hole 1.5 and is arranged as a multilayer printed circuit board.

In the assembled state of the angle-of-rotation sensor, graduated disk 2 and printed circuit board 1 mutually oppose one another, so that axis of rotation A extends through the midpoints of both elements, and in response to a relative rotation between graduated disk 2 and printed circuit board 1, angle information as a function of the instantaneous rotational position is able to be generated by induction effects in printed circuit board 1. In this context, it is inevitable that graduated disk 2 will also perform wobble motions relative to printed circuit board 1 during the rotary motion, which are caused by manufacturing or fitting tolerances.

A prerequisite for the formation of relevant angle information is that excitation conductor paths 1.4 generate an electromagnetic excitation field, changing over time, in the area of receiving tracks 1.1, 1.2, 1.3 and in the area of graduation tracks 2.1, 2.2, 2.3, respectively, scanned by them. In the exemplary embodiments shown, excitation conductor paths 1.4 are in the form of a plurality of planar-parallel, current-carrying, individual conductor paths. If a current flows in the same direction through all excitation conductor paths 1.4 of one printed-conductor unit, then an electromagnetic field oriented in the shape of a tube or cylinder forms around the particular printed-conductor unit. The flux lines of the resulting electromagnetic field extend in the form of concentric circles around the printed-conductor units, the direction of the flux lines being dependent in conventional manner on the current direction in the printed-conductor units.

The current direction of the printed-conductor units directly adjacent to a shared receiving track 1.1, 1.2, 1.3, that is, the suitable interconnection of these printed-conductor units, must be selected to be opposite, so that the flux lines in the area of receiving tracks 1.1, 1.2, 1.3 each have an identical orientation. Excitation conductor paths 1.4 are supplied with a supply voltage, changing over time, via supply-voltage taps.

Figure 7A:
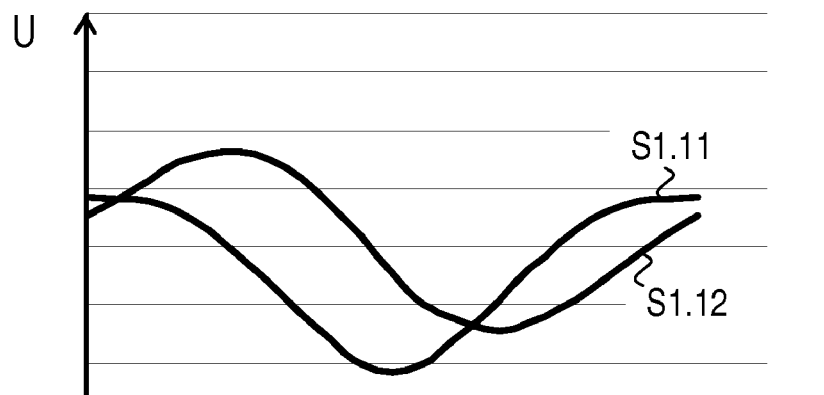
FIG. 7a shows a pattern of the signals, as it is generated by receiving conductor paths of a first receiving track.
Figure 7B:
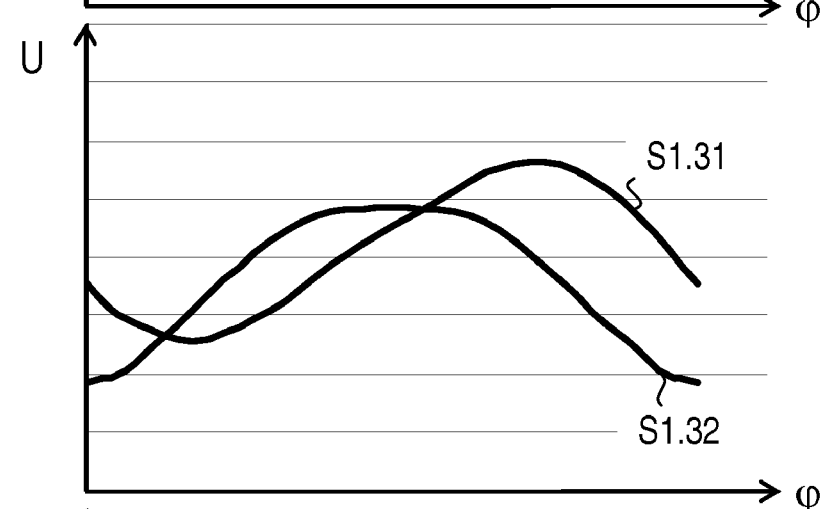
FIG. 7b shows a pattern of the signals, as it is generated by receiving conductor paths of a third receiving track.
Figure 7C:
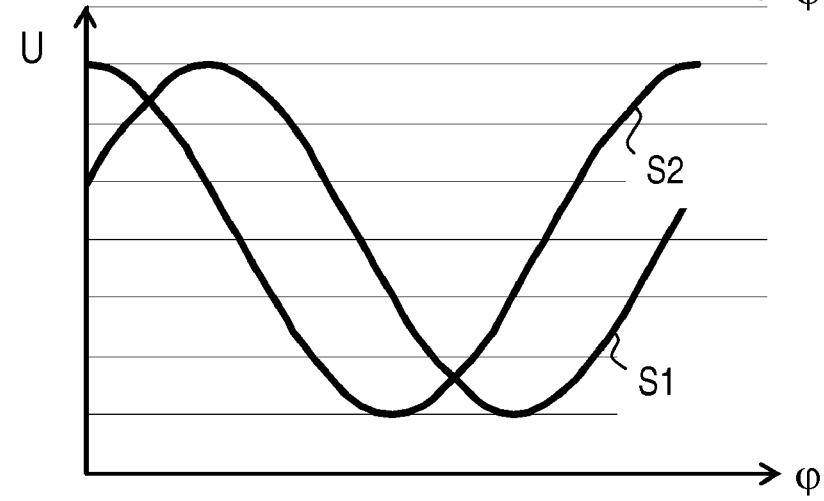
FIG. 7c shows a pattern of total signals.

As a result of induction effects, voltages are generated in receiving conductor paths 1.11, 1.12; 1.21, 1.22; 1.31, 1.32. FIGS. 7a and 7b show patterns of signals S1.11, S1.12; S1.31, S1.32 which are generated by receiving conductor paths 1.11, 1.12, 1.31, 1.32, only the envelope curves of the received voltages being depicted here for the sake of clarity. In FIGS. 7a, 7b and 7c, in each case angular position φ is plotted in a range from 0° to 360° on the abscissa, and signal level U is plotted on the ordinate. According to FIG. 7a, during operation of the angle-of-rotation sensor, receiving conductor paths 1.11, 1.12 of first receiving track 1.1 in each case generate a period number n1=1 during the scanning of first graduation track 2.1 within one rotation. Due to the displaced arrangement of receiving conductor paths 1.11, 1.12, two induced output signals are obtained during operation of the angle-of-rotation sensor, which ideally have a phase shift of 90° relative to each other. The specific pattern of signals S1.11, S1.12 actually deviates from the ideal phase shift and from an ideal sinusoidal shape as a result of tolerance-related wobble motions and inclined positions. Furthermore, signals S1.11, S1.12 have an offset relative to each other.

Signals S1.31, S1.32 of third receiving track 1.3 are generated in an analogous manner, in each case during operation of the angle-of-rotation sensor there being a period number n1=1 during the scanning of third graduation track 2.3 within one rotation here, as well. According to FIG. 7b, deviations from an ideal sinusoidal shape, as well as a less than ideal phase shift and an offset error are discernible in signals S1.31, S1.32, as well.

The phase shift between matching receiving conductor paths 1.11, 1.31; 1.12, 1.32 corresponds to the formula 360°/(2·n1), so that receiving conductor path 1.11 is thus phase-shifted by 180° with respect to receiving conductor path 1.31, like receiving conductor path 1.12 with respect to receiving conductor path 1.32, as well. Naturally, the same observation likewise holds true for graduation tracks 2.1, 2.3.

Signals S1.11, S1.12, S1.31, S1.32 are then combined or interconnected with each other such that total signals S1, S2 according to FIG. 7c are obtained. In the present case, signals S1.11, S1.12, S1.31, S1.32 are subjected to an analog subtraction. Thus, total signals S1=S1.11−S1.31 and S2=S1.12−S1.32 are formed in an analog circuit, which is placed on printed circuit board 1. In this manner, nearly ideal sinusoidal shapes are obtained for total signals S1 and S2 phase-shifted by 90°.

In a subsequent step, total signals S1, S2 are thereupon demodulated with the aid of evaluation electronics. Thus, the scanning of graduation tracks 2.1, 2.3 yields relatively rough, absolute position information within one rotation of graduated disk 2 about axis of rotation A. Total signals S1, S2 supply a unique, absolute position signal within one rotation of a shaft 4 (see FIG. 5), regardless of wobble motions and/or inclined positions of graduated disk 2 or of printed circuit board 1. In addition, direction recognition during the rotary motion is ensured via the known evaluation of total signals S1, S2 phase-shifted by 90°.

Receiving conductor paths 1.21, 1.22 of second receiving track 1.2 in each case have thirty-two, thus 25, windings, so that receiving conductor paths 1.21, 1.22 generate signals S1.21, S1.22 which have an even period number n2=32, such that a comparatively high-resolution incremental signal may be generated in response to the movement of graduated disk 2 relative to printed circuit board 1. In order to permit a high-resolution, absolute angle-of-rotation determination, an absolute angular position is formed with the accuracy of second receiving track 1.2 via a suitable algorithm. This is achieved in conjunction with the rough, absolute angular-position determination via first and third graduation tracks 2.1, 2.3.

Because of the symmetrical disposition of receiving conductor paths 1.21, 1.22 of second receiving track 1.2, the wobble motions or inclined positions play scarcely any role in the generation of signals S1.21, S1.22 of these receiving conductor paths 1.21, 1.22, so that no measures are provided with regard to the compensation of signals S1.21, S1.22 of receiving conductor paths 1.21, 1.22 of second receiving track 1.2. Accordingly, a faultless formation of a connection of demodulated total signals S1, S2 with demodulated signals S1.21, S1.22 of second receiving track 1.2 may be achieved.

However, example embodiments of the present invention are not restricted to angle-of-rotation sensors where receiving conductor paths 1.11, 1.12; 1.31, 1.32 supply only one period number n1=1 within one rotation. Rather, according to example embodiments of the present invention, the receiving conductor paths may also be formed such that the generate signals S1.11, S1.12, S1.31, S1.32 having larger, especially uneven period numbers within one rotation, for instance, n1=3 or n1=5 or n1=7. Furthermore, as an alternative, receiving conductor paths 1.21, 1.22 may generate signals S1.21, S1.22 which have a period number n2=16 or n2=64 or n2=128. Example embodiments of the present invention are of particularly great advantage when signals S1.11, S1.12, S1.31, S1.32 which have a low period number n1 are combined with signals S1.21, S1.22 which have a high period number n2.

In the following, additional exemplary embodiments are described, these additional exemplary embodiments mainly differing from the first exemplary embodiment only due to the design of graduated disk 2 and of printed circuit board 1.

Figure 3:
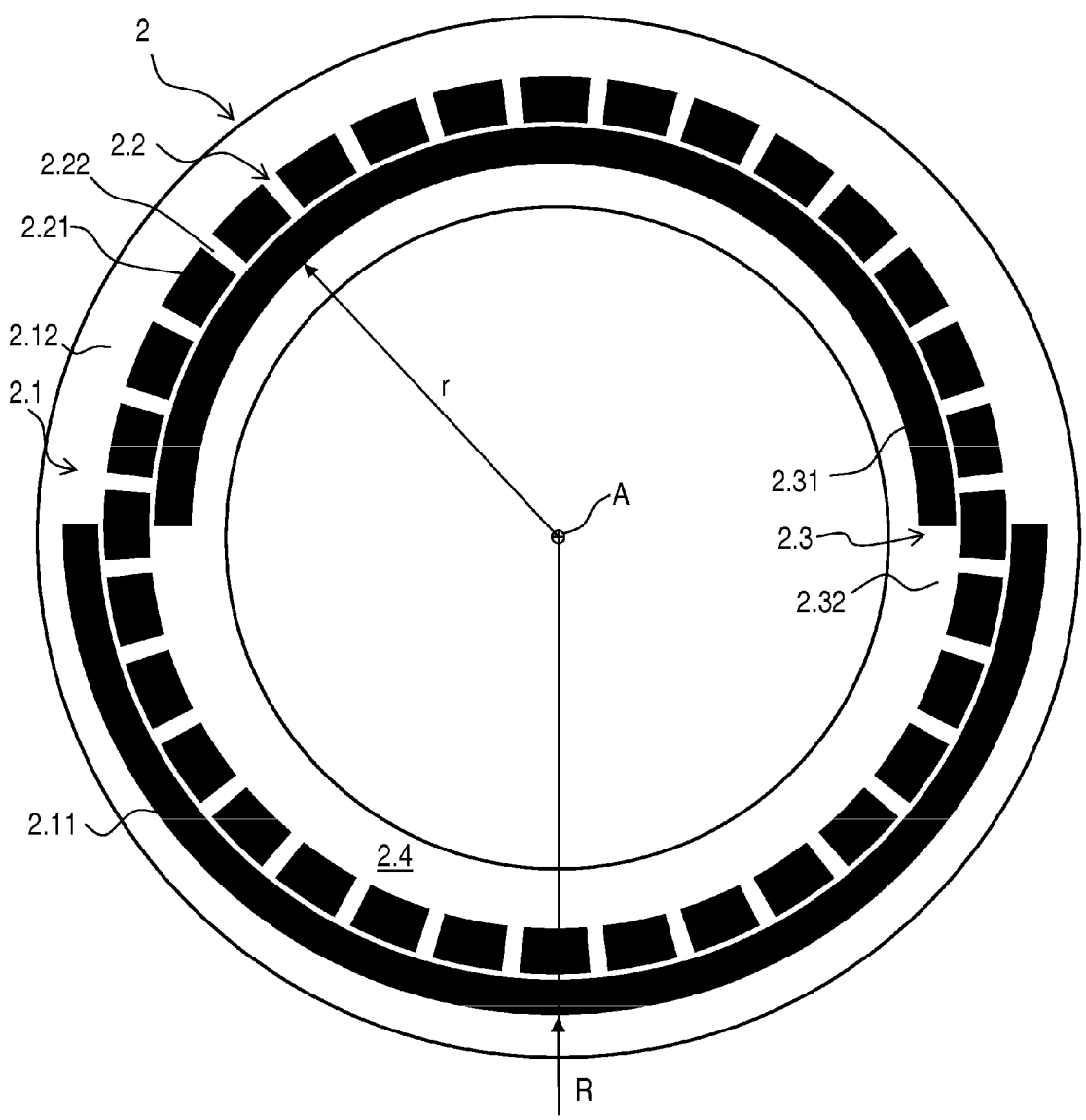
FIG. 3 is a top view of a graduated disk according to an exemplary embodiment of the present invention.
Figure 4:
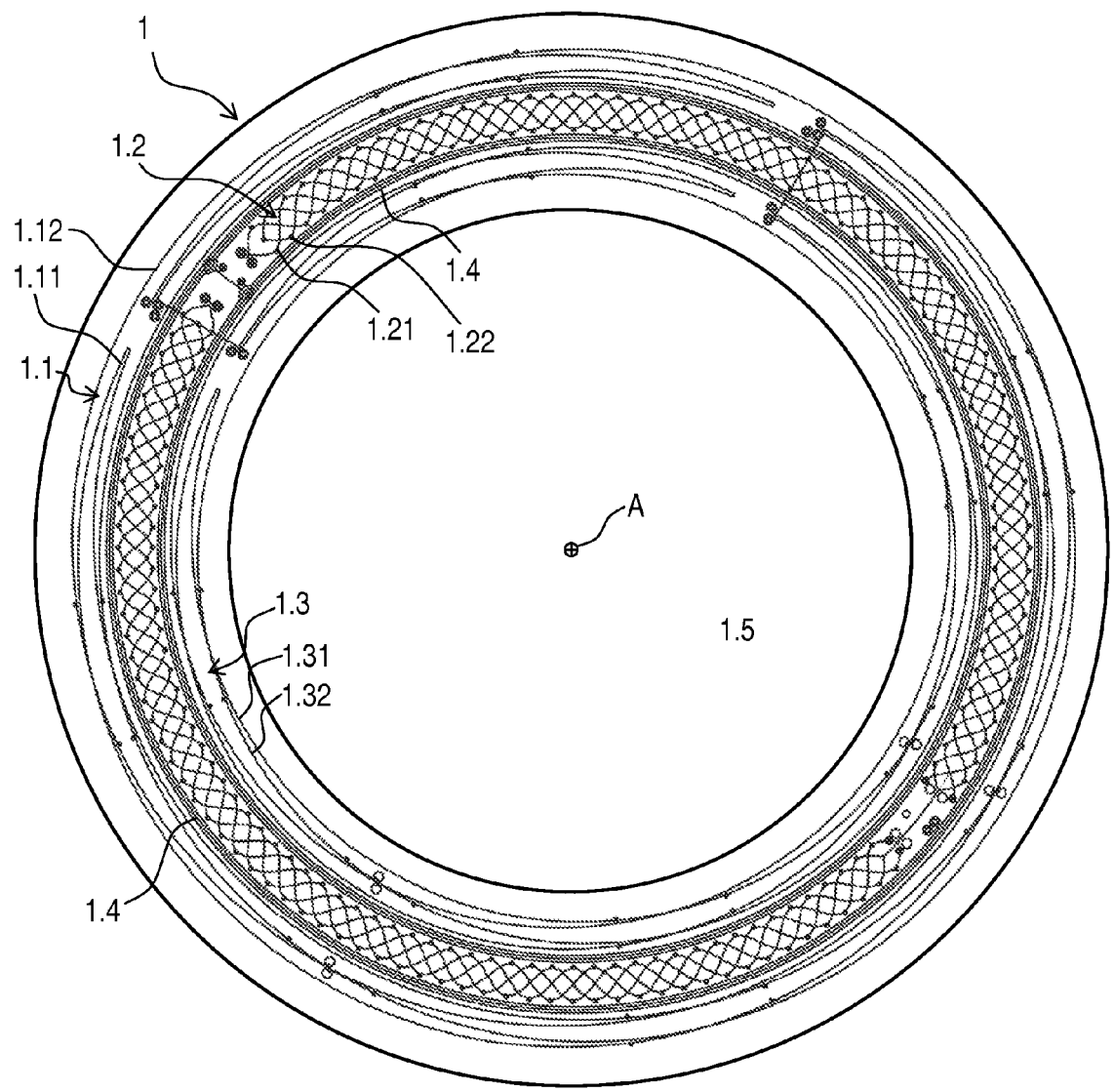
FIG. 4 is a top view of a printed circuit board according to the exemplary embodiment shown in FIG. 3

According to a second exemplary embodiment shown in FIG. 3, first graduation track 2.1 may also be disposed radially outside of second graduation track 2.2. Correspondingly, according to FIG. 4, first receiving track 1.1 then also lies radially outside of second receiving track 1.2, while third graduation track 2.3 and third receiving track 1.3 lie radially completely inside.

Figure 5:
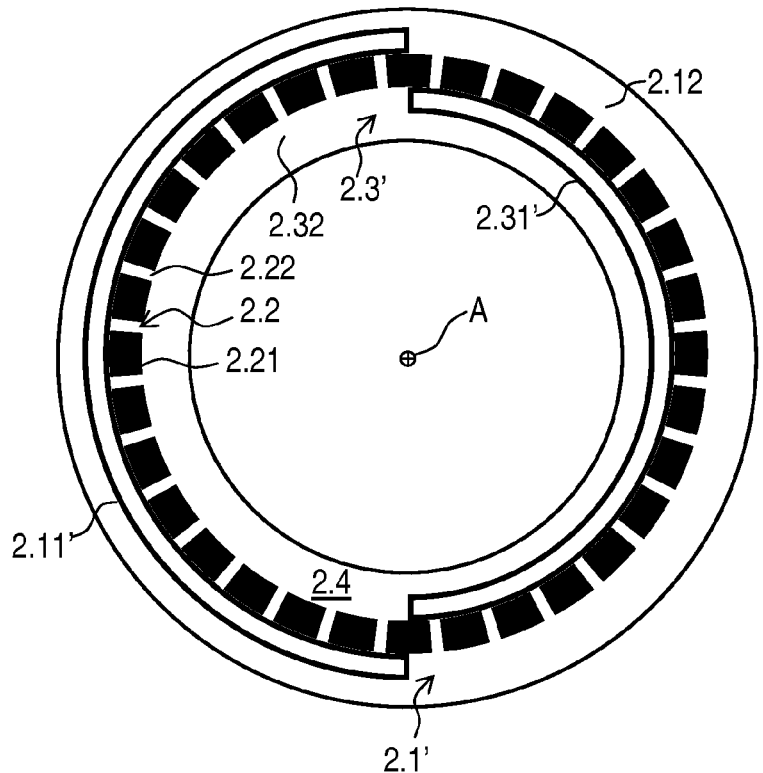
FIG. 5 is a top view of a graduated disk according to an exemplary embodiment of the present invention.
Figure 6:
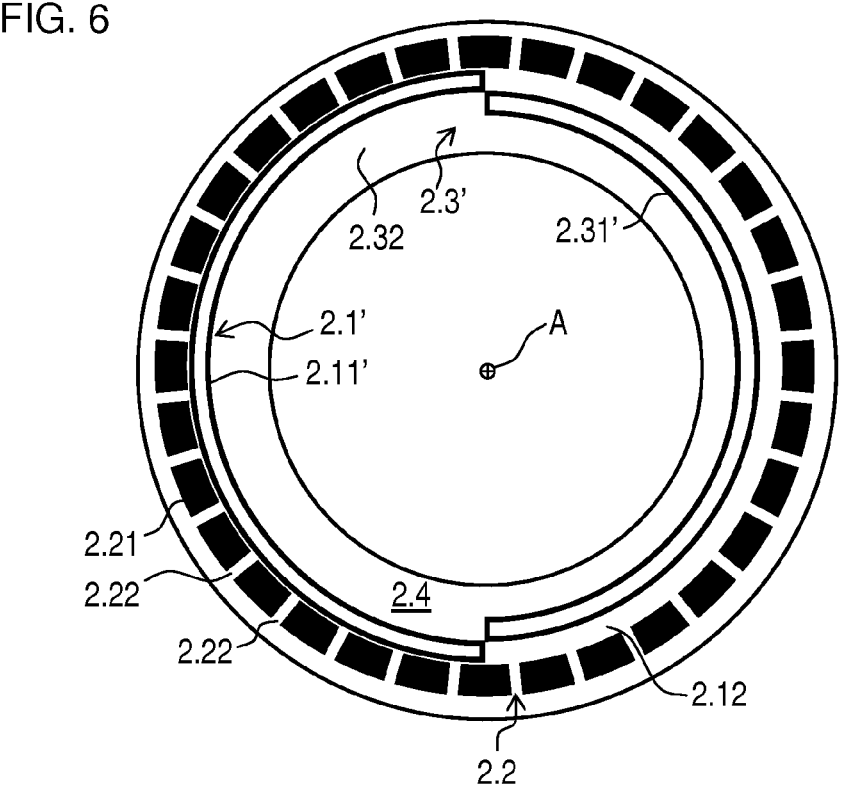
FIG. 6 is a top view of a graduated disk according to an exemplary embodiment of the present invention.

In the third and fourth exemplary embodiments according to FIGS. 5 and 6, the radial arrangement of graduation tracks 2.1', 2.2, 2.3' is similar to that in the first and second exemplary embodiments. However, graduation tracks 2.1' and 2.3' are implemented, such that electrically conductive graduation regions 2.11', 2.31' are not applied full-surface on substrate 2.4, but rather only in the form of a circumferential, conductive band. This embodiment has the advantage that the eddy currents generated in graduation regions 2.11', 2.31' flow in an exceedingly directionally-defined manner. The currents having radial directional components have decisive influence for the generating of corresponding signals. Due to the strictly radially-aligned band regions of conductive graduation regions 2.11', 2.31', currents automatically flow in this direction. The associated printed circuit boards for the third and fourth exemplary embodiments are not depicted in the figures, because they do not differ in principle from printed circuit boards 1 of the first and second exemplary embodiments. The third and fourth exemplary embodiments provide an exceedingly efficient form of graduation tracks 2.1', 2.3' or of the angle-of-rotation sensor.

The geometric arrangements of the second and fourth exemplary embodiments have the advantage that first and third receiving tracks 1.1, 1.3 have a comparatively large radial spacing. The effect of this is that the negative influences of manufacturing or fitting tolerances on the measuring result may be reduced particularly effectively.

FIG. 8 shows a rotary encoder equipped with the inductive angle-of-rotation sensor according to an example embodiment of the present invention. The rotary encoder has a stationary housing 3 and shaft 4 that is rotatable relative to the housing. Shaft 4 is used to accommodate a rotatable machine part, e.g., a motor shaft whose angular position φ is to be determined. Graduated disk 2 is secured in torsionally fixed manner to shaft 4. On the other hand, printed circuit board 1 is secured to housing 3. Because annular graduated disk 2 is able to accommodate shaft 4, graduated disk 2 has a comparatively large inner bore hole for receiving shaft 4 to be measured. Accordingly, wobble motions and/or inclined positions have a relatively great influence on the local (specific to receiving conductor paths 1.11, 1.12; 1.21, 1.22; 1.31, 1.32) scanning distance or axial air gap between graduated disk 2 and printed circuit board 1. The adverse effects on the measuring result because of the manufacturing and fitting tolerances are reduced significantly by example embodiments of the present invention.

What is claimed is:

1. An inductive angle-of-rotation sensor, comprising:
   a printed circuit board;
   an excitation conductor path applied on the printed circuit board;
   a first receiving conductor path applied on the printed circuit board;
   a second receiving conductor path applied on the printed circuit board;
   a third receiving conductor path applied on the printed circuit board; and
   a graduation element rotatable relative to the printed circuit board, the graduation element including a first graduation track, a second graduation track, and a third graduation track;
   wherein the first and second graduation tracks and the first and second receiving conductor paths are arranged such that within one rotation of the graduation element relative to the printed circuit board, signals having a first period number are generatable by the first receiving conductor path, and signals having a second period number are generatable by the second receiving conductor path; and
   wherein the third graduation track and the third receiving conductor path are arranged such that within one rotation of the graduation element relative to the printed circuit board, signals having the first period number are generatable by the third receiving conductor path.

2. The inductive angle-of-rotation sensor according to claim 1, further comprising a device adapted to combine the signals of the third receiving conductor path with the signals of the first receiving conductor path to form a total signal, from which a relative angular position between the printed circuit board and the graduation element is determinable.

3. The inductive angle-of-rotation sensor according to claim 1, wherein the first period number is smaller than the second period number.

4. The inductive angle-of-rotation sensor according to claim 1, wherein the first period number is odd and the second period number is even.

5. The inductive angle-of-rotation sensor according to claim 1, wherein the first period number has the value one.

6. The inductive angle-of-rotation sensor according to claim 1, wherein the signals generatable by the first receiving conductor path have a phase shift of 360°/(2·n1) relative to the signals generatable by the third receiving conductor path, n1 representing the first period number of the signals of the first and third receiving conductor paths.

7. The inductive angle-of-rotation sensor according to claim 1, wherein the printed circuit board has a first receiving track including two first receiving conductor paths, and a third receiving track including two third receiving conductor paths.

8. A method for operating an angle-of-rotation sensor including: a printed circuit board, on which an excitation conductor path, a first receiving conductor path, a second receiving conductor path, and a third receiving conductor path are applied; and a graduation element rotatable relative to the printed circuit board and including a first graduation track, a second graduation track, and a third graduation track, comprising:

within one rotation of the graduation element relative to the printed circuit board, generating signals having a first period number by the first and third receiving conductor paths and generating signals having a second period number by the second receiving conductor path;

combining the signals having the first period number to form a total signal; and determining a relative angular position between the printed circuit board and the graduation element from the total signal.

9. The method according to claim 8, wherein the combining includes combining the signals having the first period number to form the total signal by at least one of (a) an addition and (b) a subtraction operation.

10. The method according to claim 8, wherein the first period number is smaller than the second period number.

11. The method according to claim 8, wherein the first period number is odd and the second period number is even.

12. The method according to claim 8, wherein the first period number has the value one.

13. The method according to claim 8, wherein the combined signals have a phase shift of 360°/(2·n1), n1 representing the first period number of the signals of the first and third receiving conductor paths.

14. The method according to claim 8, wherein the printed circuit board includes a first receiving track including two first receiving conductor paths, and a third receiving track including two third receiving conductor paths, so that two total signals are generated.

15. The method according to claim 14, wherein the two total signals have a phase shift of 90°.

* * * * *